(12) United States Patent
Anderson et al.

(10) Patent No.: US 9,315,000 B2
(45) Date of Patent: Apr. 19, 2016

(54) PLATEN REINFORCING TENSION DIRECTED PRESSURE MATERIALS MANUFACTURING PRESS

(76) Inventors: Scott C Anderson, Lafayette, CO (US); Dennis W Clark, Erie, CO (US)

(*) Notice: Subject to any disclaimer, the term of this patent is extended or adjusted under 35 U.S.C. 154(b) by 648 days.

(21) Appl. No.: 13/585,815

(22) Filed: Aug. 14, 2012

(65) Prior Publication Data
US 2013/0062019 A1  Mar. 14, 2013

Related U.S. Application Data

(60) Provisional application No. 61/575,146, filed on Aug. 15, 2011.

(51) Int. Cl.
*B32B 37/00* (2006.01)
*B29C 44/16* (2006.01)

(52) U.S. Cl.
CPC ............. *B32B 37/0046* (2013.01); *B29C 44/16* (2013.01)

(58) Field of Classification Search
CPC ........................... B29C 44/16; B32B 37/0046
USPC ................. 156/228, 358, 359, 494, 580, 581, 156/583.1
See application file for complete search history.

(56) References Cited

U.S. PATENT DOCUMENTS 3,638,560 A * 2/1972 Morgan et al. ................ 100/300

* cited by examiner

*Primary Examiner* — James Sells
(74) *Attorney, Agent, or Firm* — John T. Henri

(57) ABSTRACT

The present invention relates to a novel device to manufacture polyurethane foam boards used in structurally insulated panel known as insulated building material press. The press enables the application of pressure across a large area while foaming and curing polyurethane under pressure, curing glue or otherwise bonding materials into a finished product. The press uses a simple principle to distribute pressure evenly across the platens avoiding the need for heavy and expensive parts used in the construction of building material presses of the prior art.

12 Claims, 4 Drawing Sheets

PLATEN REINFORCING TENSION DIRECTED PRESSURE MATERIALS MANUFACTURING PRESS

CROSS REFERENCE TO RELATED APPLICATIONS

This application claims the benefit of U.S. Provisional Application No. 61/575,146 filed on 15 Aug. 2011 which is incorporated herein in its entirety.

FIELD OF THE INVENTION

The present invention relates to dynamic press structures used in the manufacturing arts. In particular an insulated building material press for use in manufacturing structural building panels or materials for use in building construction where pressure across a large area while foaming and curing polyurethane under pressure, curing glue or otherwise bonding materials into a finished product requires the use of a building material press.

BACKGROUND OF THE INVENTION

In manufacturing structurally insulated panels, pressure loads are carried across the surface of platens within building material presses to provide firm, consistent pressure to surfaces of polystyrene structural panels during polyurethane pressurized foaming and curing or during bonding of adhesive materials to insulating elements and or structural elements of building materials.

Typically building material presses cover large surface areas multiple feet wide (or tall) and many feet long. A typical press may be 4 feet wide and 8, 10 or 24 feet long. Other common sizes of presses are 2 feet and 8 feet wide. Besides other sizes used, custom presses of a suitable width built to requirement can be employed. The pressure per square inch from a press may be low but cumulative force over the entire surface is great.

Many low pressure applications require low rigidity platens. The outward pressure from some manufacturing processes is relatively uniform across the surface. As higher pressures are required platens from lower pressure presses deform or break. The current solution is to increase platen rigidity along with pressure increases resulting in more and more massive platens which significantly increase press costs.

Another problem is some manufacturing materials act like fluid during the manufacturing process. The fluid nature of materials such as uncured foaming polyurethane allows flow under pressure to the weakest points of the platen and exaggerates press weaknesses. Typically this results in deformation first forming towards the center of the platen which increases the need to use massive reinforced platens. Without a massive platen made from extremely rigid materials, the pressed material would not remain flat or planar on the surface especially at the center of the panel. One way to restate this is the pressurized material acts like a fluid and seeks ideal pressure vessel shapes resulting in more pressure towards the center of the panel.

Prior art for the manufacture of building material presses includes hydrolic and air ram presses, rigid boxes with steel cabling and screw down locking mechanisms, mechanical screw presses, and vacuum presses. All these presses seek to apply relatively even pressure across the surface of the presses materials. If pressures exceed the strength of the platen to hold the material in place, the platen is reinforced until it is rigid enough to hold.

Recently demand for energy efficient building solutions has created a capacity shortage in the number of presses available. High press costs to add incremental production is constraining industry by slowing capability additions among building material vendors in the polyurethane panel space. To rapidly expand production of these highly desirable and in demand materials a lower cost press is needed.

SUMMARY OF THE INVENTION

The present invention describes a building material press comprising opposing press platens, one or more tensioning devices around the press, and, one or more sets of tension transfer structures to transfer pressure from said tensioning device to said platens.

In various embodiments the building material press has platens that comprise of a material such as wood, laminated strand lumber (LSL), laminated veneer lumber (LVL), micro laminated lumber, oriented strand board, plywood, laminated layered board, synthetic wood, composite, carbon fiber board, magnesium oxide board, steel, aluminum, alloy, cement board or hardboard.

In different embodiments, the building material press has a platen which is various thicknesses.

In different embodiments the building material press has a tensioning device consisting of a rope, cable, line, wire, strap, web or sheet.

In one embodiment the building material press has a tensioning device that is a strap around the press tightened to form a tension ring.

In various embodiments the building material press has a tension transfer structures which comprise of a material such as wood, laminated strand lumber (LSL), laminated veneer lumber (LVL), micro laminated lumber, oriented strand board, plywood, laminated layered board, synthetic wood, composite, carbon fiber board, magnesium oxide board, steel, aluminum, alloy, cement board or hardboard.

In one embodiment the building material press has platens that are heated or cooled to temperatures preferential to the pressing process.

In one embodiment the building material press has a tensioning device which comprises a control device to increase and decrease force applied on the platen through said tension transferring structures.

In one embodiment the building material press has tension transfer structure that bears one or more supports to spread pressure on the surface of said platen.

In one embodiment the building material press has a tension support structure that is permanently or semi-permanently connected to said platen.

In one embodiment the building material press has tension support structure which is not connected to platen but held in place during pressing of materials by tension applied by said tensioning device.

In one embodiment the building material press has a tensioning device which comprises a controlling device capable of releasing all tension for removal of all or part of tensioning device when desired.

BRIEF DESCRIPTION OF THE DRAWINGS

A complete understanding of the present invention may be obtained by reference to the accompanying drawings, when considered in conjunction with the detailed description, in which.

DETAILED DESCRIPTION OF THE EMBODIMENTS

Figure 1:
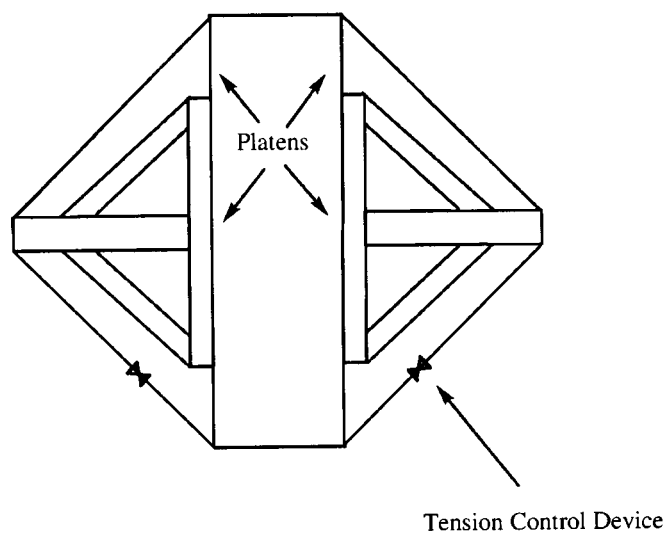
FIG. 1 depicts a perspective view of a structural building material press with tension transferring structure reinforcement.
Figure 2:
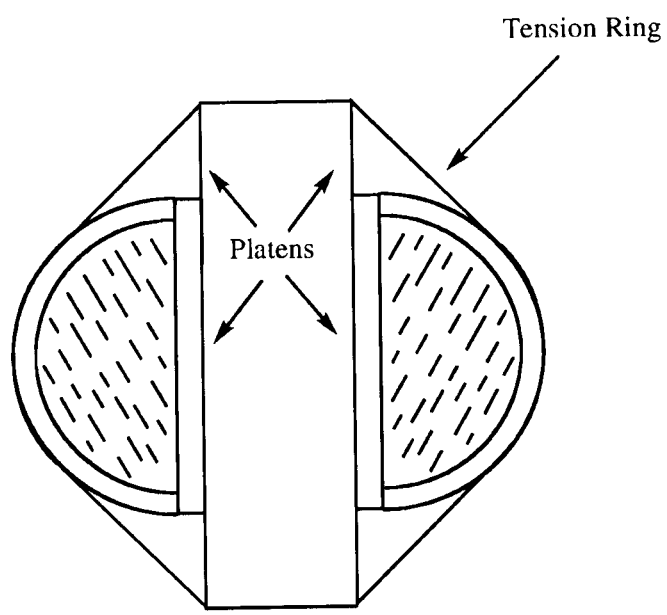
FIG. 2 depicts a perspective view of a structural building material press with tension transferring structure reinforcement.
Figure 3:
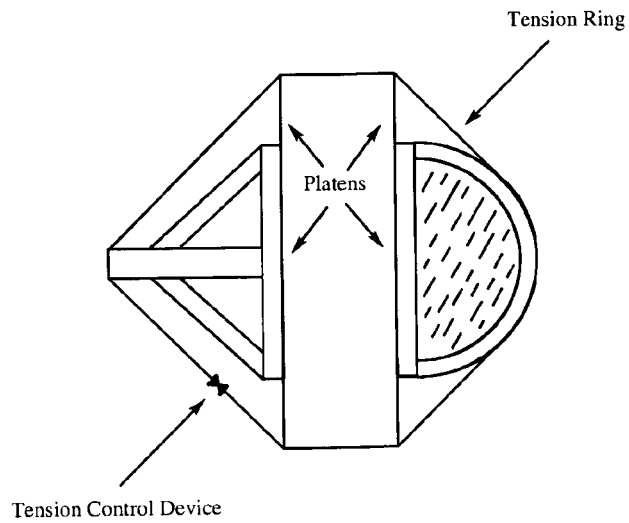
FIG. 3 depicts a perspective view of a structural building material press with tension transferring structure reinforcement. In the current preferred embodiment, one pressure point in contact with the tension ring at one point that is removed from the platen surface on one side of the press and other side of the press illustrating another type of tension transferring structure with a solid core and curved outer surface in contact with a tension ring to mimic an ideal pressure vessel quality.
Figure 4:
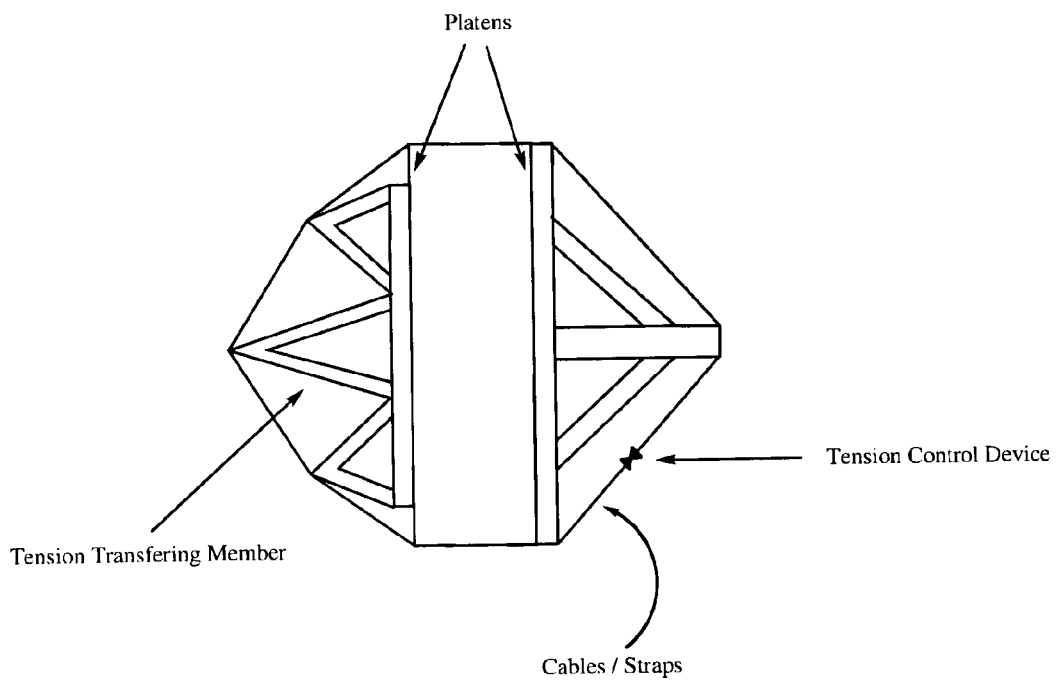
FIG. 4 depicts a perspective end view of a building material press illustrating another type of tension transferring structure with a large number of points along the curve mimicking ideal pressure vessel qualities and on one side of the press and other side of the press illustrates a perspective end view of a building material press illustrating another type of tension transferring member.
Figure 5:
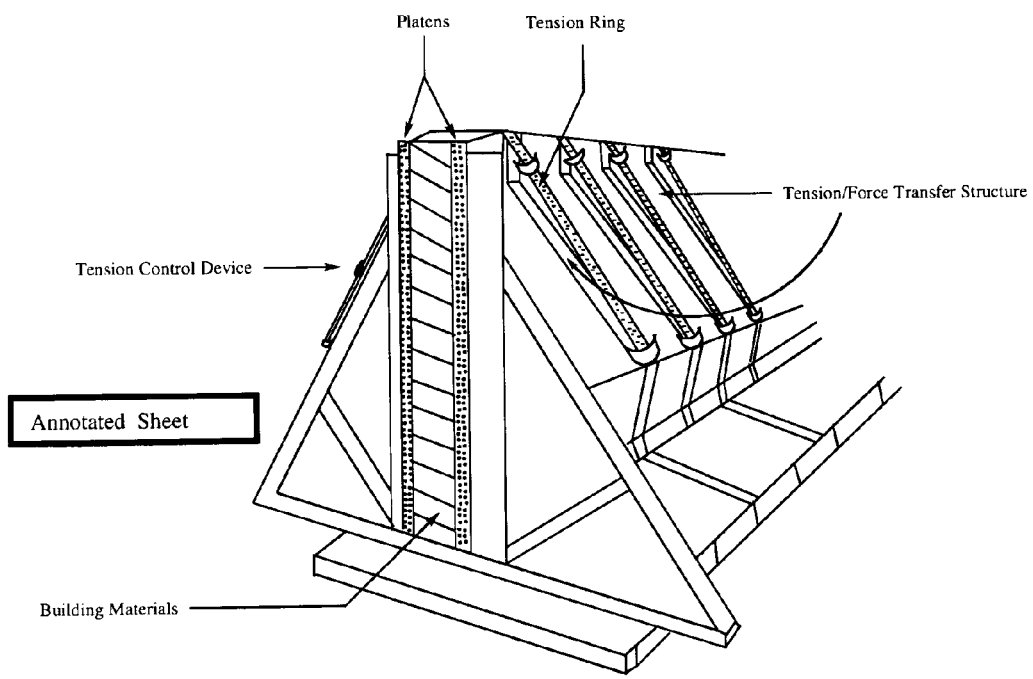
FIG. 5 depicts a press filled with building materials under tension during a pressurized process.
Figure 6:
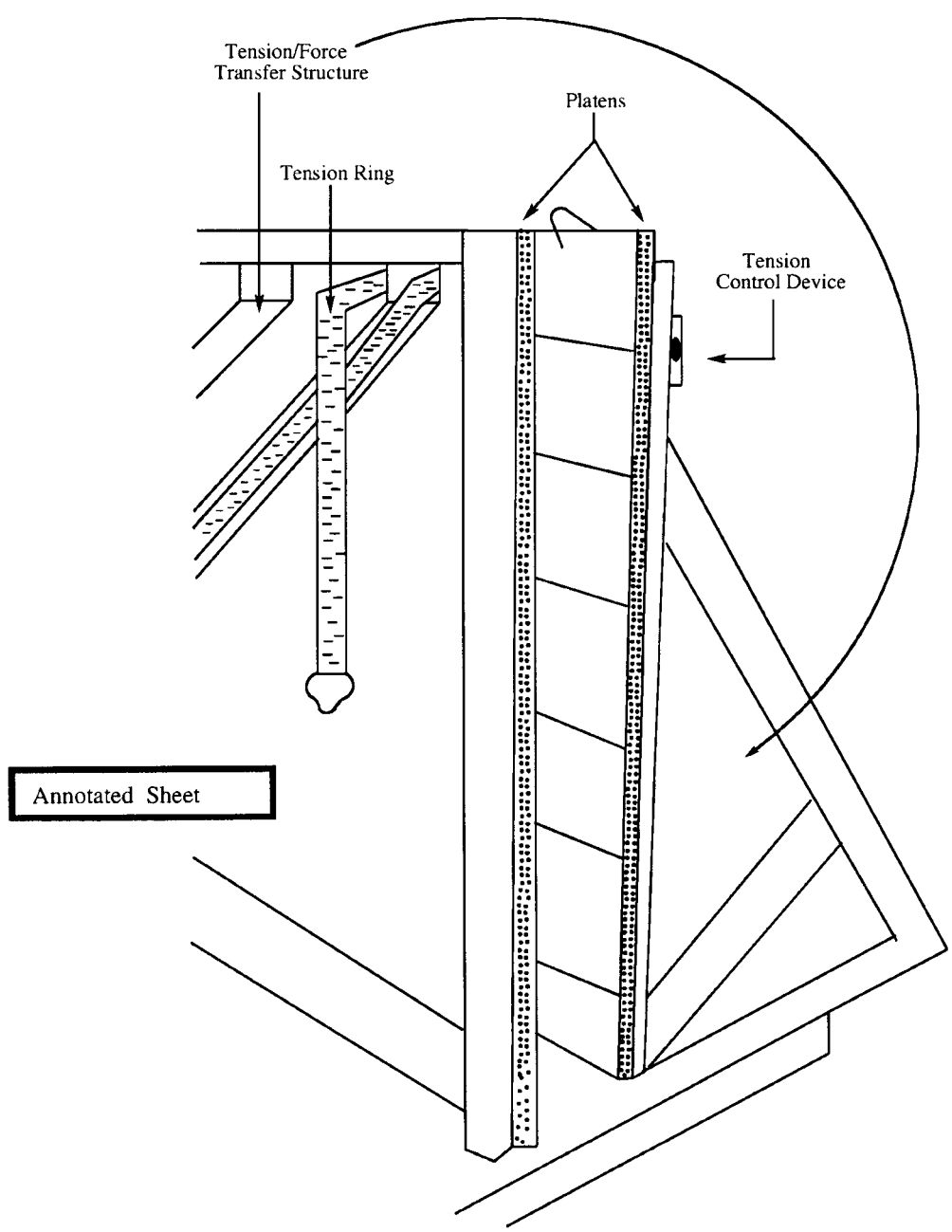
FIG. 6 depicts a press ready to be filled with building materials with tension of the tension ring temporarily removed.

The foregoing examples of the related art and limitations are intended to be illustrative and not exclusive. Other limitations of the related art will become apparent to those of skill in the art upon a reading of the specification and a study of the drawings or figures as provided herein.

The current invention comprises of two structural pieces serving as press platens. Said platens do not receive uniform pressure distributed across a platen but instead receive dissimilar pressures with more pressure transferred through tension transferring structure(s) towards the center of the platen with less transfer to the edges. This allows use of less expensive platen material. The dissimilar pressures are accomplished by using straps, cables, or other tension band or devices (tension "rings") around the press shaped to approximate the shape of an ideal pressure vessel such as a cylinder. Other shapes the pressure transferring devices may be configured are pyramidal shape, prism shape, dome, conical shape and the like to enable even distribution of pressure.

The tension rings are pulled together around the press in unbroken tension. The distance of the reinforcement from the press allows more feedback tension on the center. The present invention is constructed to create additional pressure at the area most susceptible to deformation or bulging.

In one embodiment, a building material press is made from various materials including wood, composite, and metal and setup in a way so that the platens are held apart to allow for skins "osb/plywood/textile/composites" to be placed between the inside face of the platens. Tension transfer devices are attached to the outside face of each platen on an equal spacing. Tension rings go from one transfer device or structure mounted on the outside of one platen to the transfer device mounted to the outside platen on the opposite side of the press. In essence the tension ring is connected in away to make an unbroken ring. The tension rings must stay tight around the press during the process. Once the tension rings are tight and holding the press in place. Polyurethane foam is then put into the area between the skins. As the foam fills the void and expands the tension rings maintain an equal surface pressure on all faces and edges of the platen. In doing this the press will produce a high quality panel that is uniform in thickness with little or no deflection from the face of the platen.

The platens and tension transfer structures or devices of the present invention may be made from materials such as wood, laminated strand lumber (LSL), laminated veneer lumber (LVL), micro laminated lumber, oriented strand board, plywood, laminated layered board, synthetic wood, composite, carbon fiber board, magnesium oxide board, steel, aluminum, alloy, cement board and hardboard.

Some of the components of the building material press defined below:

Tension transfer structures may be spaced at 1 per linier feet on side of press and also known as a STrucbrace. They are constructed of composites, metal, wood, natural or synthetic fibers.

STrucbrace has internal structural support that provides rigidity and maintains flat plane of a structurally insulated panel or Compoflat during the press process. The STrucbrace is the connector of the STrucring to the press assembly and is often times triangular or radial in shape.

A tensioning device is a crucial component in the press system. It links all the press components together, while providing the necessary tension to contain the process in the press. It is also called a STrucring or "tension ring". Placed about 1 per STrucbrace. STrucring is made of various textiles, composites, Nylon, Kevlar, woven textiles, cable, line, wire, strap, web or sheet.

A encasement also known as a BoxCompoflat qty-1 per part/panel in press assembly may be made from composites, metal, wood, HDPE, natural or synthetic fibers. The BoxCompoflat covers all surfaces of the panel/part during the manufacturing process and is designed to be removed from the press to extract the panel/part and improve the efficiency of the press.

What is claimed is:

1. A building material press to make structural insulated panels comprising,
    a) opposing press platens to form said structural insulated panel,
    b) one or more tensioning devices around the press to link all the press components together while providing the necessary tension, and,
    c) one or more sets of tension transfer structures attached to the outside face of each platen to give internal structural support, provide rigidity and to transfer pressure from said tensioning device to said platens,
    wherein each tension transfer structure has the shape of a cylinder, pyramid, prism, dome or cone.

2. A building material press of claim 1, where said platens comprise a material selected from the group consisting of wood, laminated strand lumber (LSL), laminated veneer lumber (LVL), micro laminated lumber, oriented strand board, plywood, laminated layered board, synthetic wood, composite, carbon fiber board, magnesium oxide board, steel, aluminum, alloy, cement board and hardboard.

3. A building material press of claim 1 where said platen is 1 mm to 160 mm in thickness.

4. A building material press of claim 1 where said tensioning device is selected from a group consisting of a rope, cable, line, wire, strap, web and sheet.

5. A building material press of claim 1 where said tensioning device is a strap around the press tightened to form a tension ring.

6. A building material press of claim 1 where said tension transfer structures comprises material selected from a group consisting of wood, laminated strand lumber (LSL), laminated veneer lumber (LVL), micro laminated lumber, oriented strand board, plywood, laminated layered board, synthetic wood, composite, carbon fiber board, magnesium oxide board, steel, aluminum, alloy, cement board and hardboard.

7. A building material press of claim 1 where said platens are heated and cooled to temperatures preferential to the pressing process.

8. A building material press of claim 1 where said tensioning device comprises a control device to increase and decrease force applied on the platen through said tension transferring structures.

9. A building material press of claim 1 where said tension transfer structure bears one or more supports to spread pressure on the surface of said platen.

10. A building material press of claim 1 where said tension support structure is permanently or semi-permanently connected to said platen.

11. A building material press of claim 1 where said tension support structure is not connected to platen but held in place during pressing of materials by tension applied by said tensioning device.

12. A building material press of claim 1 where said tensioning device comprises a controlling device capable of releasing all tension for removal of all or part of tensioning device when desired.

\* \* \* \* \*